United States Patent
Figueroa Martinez

(10) Patent No.: US 9,951,230 B2
(45) Date of Patent: Apr. 24, 2018

(54) FIRE-RESISTANT, INSULATING, ECOLOGICAL AND CORROSION-INHIBITING COATING

(71) Applicant: G-COVER DE MÉXICO, S.A. DE C.V., Sonora (MX)

(72) Inventor: Moises Figueroa Martinez, Querétaro (MX)

(73) Assignee: G-COVER DE MÉXICO, S.A. DE C.V., Sonora (MX)

( * ) Notice: Subject to any disclaimer, the term of this patent is extended or adjusted under 35 U.S.C. 154(b) by 0 days.

(21) Appl. No.: 15/537,383

(22) PCT Filed: Dec. 16, 2014

(86) PCT No.: PCT/MX2014/000208
§ 371 (c)(1),
(2) Date: Jun. 16, 2017

(87) PCT Pub. No.: WO2016/099234
PCT Pub. Date: Jun. 23, 2016

(65) Prior Publication Data
US 2017/0327699 A1    Nov. 16, 2017

(51) Int. Cl.
| C09D 5/18 | (2006.01) |
| C09D 5/00 | (2006.01) |
| C09D 7/12 | (2006.01) |
| C09D 7/00 | (2006.01) |
| C09D 157/06 | (2006.01) |
| C09D 5/08 | (2006.01) |
| C09D 5/14 | (2006.01) |

(52) U.S. Cl.
CPC ............. *C09D 5/18* (2013.01); *C09D 5/00* (2013.01); *C09D 5/084* (2013.01); *C09D 5/14* (2013.01); *C09D 7/002* (2013.01); *C09D 7/125* (2013.01); *C09D 7/1216* (2013.01); *C09D 7/1233* (2013.01); *C09D 7/1291* (2013.01); *C09D 157/06* (2013.01)

(58) Field of Classification Search
None
See application file for complete search history.

(56) References Cited

U.S. PATENT DOCUMENTS

| 5,079,077 A * | 1/1992 | Sakayanagi | H01B 3/04 428/324 |
| 5,356,446 A * | 10/1994 | Smetana | C04B 14/185 106/675 |
| 5,612,130 A | 3/1997 | Orlov et al. | |
| 2005/0214534 A1 | 9/2005 | Adamo et al. | |
| 2008/0233295 A1 | 9/2008 | Ye et al. | |
| 2014/0264140 A1* | 9/2014 | Gong | C04B 38/02 252/62 |
| 2014/0302979 A1* | 10/2014 | Okuya | C04B 41/91 501/141 |
| 2016/0245451 A1* | 8/2016 | Okada | C08G 18/00 |
| 2017/0327696 A1* | 11/2017 | Figueroa Martinez | C09D 5/08 |

FOREIGN PATENT DOCUMENTS

| CN | 103810089 A | 5/2014 |
| CN | 104130638 A | 11/2014 |
| EP | 0 583 051 A | 2/1994 |
| GB | 2425314 A | 10/2006 |
| WO | WO 2005/030671 | 4/2005 |
| WO | WO 2010/080465 A1 | 7/2010 |

OTHER PUBLICATIONS

International Search Report, dated Jul. 21, 2015 for corresponding International Application No. PCT/MX2014/000208 with English translation.
Written Opinion of the ISA, dated Jul. 21, 2015 for corresponding International Application No. PCT/MX2014/000208 with English translation.

* cited by examiner

*Primary Examiner* — Joseph D Anthony
(74) *Attorney, Agent, or Firm* — Intellectual Property Law Group LLP

(57) ABSTRACT

The invention relates to a composition used as a fire-resistant, insulating, ecological and corrosion-inhibiting coating, comprising: 23-50% water, 4-20% diatomite C110 (Celite C110®), 2-8% manganese oxide, 3-10% calcined alumina, 7-24% elastomeric acrylic resin, 1-4% acrylic thickener, 0.3-2% ammonium hydroxide, and 5-14% ceramic fiber. Preferably, the composition also includes optionally the following components in order to provide the fire-resistant, insulating, ecological and corrosion-inhibiting properties: 1-7% titanium bioxide, 1-9% hexylenglycol, 2-18% dibutyl phthalate, 1-9% texanol, 0.7-4% fungicide, or 0.4-3% anti-foaming agent.

7 Claims, No Drawings

FIRE-RESISTANT, INSULATING, ECOLOGICAL AND CORROSION-INHIBITING COATING

FIELD OF THE INVENTION

The present invention refers to water-based coating compositions which are insulating, fire-resistant, corrosion-inhibiting and ecological and have several industrial uses.

BACKGROUND OF THE INVENTION

There are many coating compositions found in the prior art which provide many properties like, for example, flame resistance, corrosion resistance, heat resistance, water resistance, or acid or alkaline resistance.

For example, European Patent Application no. EP 0 583 051 A1 teaches a water-based coating composition with flame resistance, corrosion resistance, heat resistance, and acid or alkaline resistance properties but with very limited applications and thermal expansion, thermal shock, fumes, mechanical resistance, weatherproof resistance and eco-friendly properties, not to mention that it is high cost, is made up of expensive raw materials, requires complex mixing technology and generates mineral and metallurgical waste due to its particular and limited composition and manufacturing method comprising a heat resistant metal oxide and a heat resistant silica or aluminum silicate in an alkaline metal silicate aqueous solution.

Likewise, U.S. Patent Application No. 2008/0233295 A1 teaches an antioxidant coating composition with very limited applications and thermal expansion, thermal shock, fumes, mechanical resistance, weatherproof resistance and eco-friendly properties, not to mention that it is high cost, is made up of expensive raw materials, requires complex mixing technology and generates mineral and metallurgical waste due to its particular and limited composition and manufacturing method comprising a prepared paste based upon a mixture of manganese mineral, metallurgical solid waste, aluminum powder, an organic thickener and an inorganic binder.

Similarly, International PCT Application No. WO 2005/030671 teaches a fire-resistant composition but with very limited applications and thermal expansion, thermal shock, fumes, mechanical resistance, weatherproof resistance and eco-friendly properties, not to mention that it is high cost, is made up of expensive raw materials, requires complex mixing technology and generates mineral and metallurgical waste due to its particular and limited composition and manufacturing method comprising organic or inorganic fiber, fly ash, a fire-resistant agent and a fire-cured resistant resin.

Finally, U.S. Pat. No. 5,612,130 teaches a multi-purpose coating with resistance to fire, corrosion, acids, alkalis, electrolytes, microorganisms, or strong thermal fluids but with very limited applications and thermal expansion, thermal shock, fumes, mechanical resistance and weatherproof resistance and eco-friendly properties, not to mention that it is high cost, is made up of expensive raw materials, requires complex mixing technology and generates mineral and metallurgical waste due to its particular and limited composition and manufacturing method comprising a continuous lower layer which is fire resistant and is oxidized graphite based and a hydrophobic upper layer comprising an inorganic hydrophobic powder, an adhesive, a silicone liquid and a volatile organic solvent.

Notwithstanding, none of the coating compositions found in the prior art have eco-friendly properties and a very high performance when it comes to showing thermal expansion, thermal shock, fumes, mechanical resistance, weatherproof resistance and eco-friendly properties not to mention that it is low cost, requires very simplified manufacturing technology, and cheap raw materials as the one of the composition sough to be protected in the present application.

SUMMARY OF THE INVENTION

The present invention consists of a fire-resistant, insulating, ecological and corrosion-inhibiting coating composition.

The present invention consists of a water-based coating composition comprising: 23-50% water, 4-20% diatomite C110 (Celite C110®), 2-8% manganese oxide, 3-10% calcined alumina, 7-24% elastomeric acrylic resin, 1-4% acrylic thickener, 0.3-2% ammonium hydroxide, and 5-14% ceramic fiber. Preferably, the composition also includes optionally the following components in order to provide the fire-resistant, insulating, ecological and corrosion-inhibiting properties: 1-7% titanium bioxide, 1-9% hexylenglycol, 2-18% dibutyl phthalate, 1-9% texanol, 0.7-4% fungicide, or 0.4-3% anti-foaming agent.

DETAILED DESCRIPTION OF THE INVENTION

The present invention consists of a fire-resistant, insulating, ecological and corrosion-inhibiting coating composition, comprising: 23-50% water, 4-20% diatomite C110 (Celite C110®), 2-8% manganese oxide, 3-10% calcined alumina, 7-24% elastomeric acrylic resin, 1-4% acrylic thickener, 0.3-2% ammonium hydroxide, and 5-14% ceramic fiber. Preferably, the composition also includes optionally the following components in order to provide the fire-resistant, insulating, ecological and corrosion-inhibiting properties: 1-7% titanium bioxide, 1-9% hexylenglycol, 2-18% dibutyl phthalate, 1-9% texanol, 0.7-4% fungicide, or 0.4-3% anti-foaming agent.

The fire-resistant, insulating, ecological and corrosion-inhibiting coating is a coating that was designed to have a wide range of applications, among others, high temperature resistance and suppression, be it through direct flame contact or by means of liquid flow or gasification.

Through the previously-mentioned properties, the many applications for the coating include: (1) the fire-resistant coating prevents temperature transfer by the flame contact due to the fact that the coating is developed on the basis of ceramic materials; (2) thermal insulator substitutes mineral wool. By means of the coating composition, the insulating property being offered as a function of the thickness provides an excellent performance and, thanks to its low weight, can be applied in any type of substrate, pipeline coating or pipes. With its mechanical resistance and corrosion inhibition, the coating can be applied in any type of pipe, regardless of the diameter of the same as it can be applied through the aspersion method. With that, the pipe is endowed with a longer operating useful life and with a coating which will provide all of the previously-mentioned benefits.

The physical and chemical properties of the coating comply with the highest standards and specifications in the industry such as the ASTM C87 industry standard which refer to the content of chlorides in the coating, which attained a result in accordance with the corresponding methodology of 2 ppm (parts per million). Due to these results, no harmful gases are generated when in contact with the fire, be it directly or indirectly.

The coating is considered to be within the corrosion inhibitor category due to its composition. The coating acts as an encapsulator for the substrate in which it is applied and, thus, breaks the corrosion triangle by eliminating one of the elements, in this case, oxygen, which by not coming into direct contact with the coated surface, prevents it from undergoing the oxidation process.

The coating has been assessed under the ASTM E84 industry standard which consists of the burn resistance, in which the required minimum time is 4 hours in a direct fire operation, obtaining through that, the necessary resistance for compliance with the industry standard.

The invention, through its composition makeup, does not contain any alkaline or non-biodegradable element, as all of its elements are inert minerals which, as a result, leads to a rapid integration with the environment and is for that reason, considered biodegradable.

The coating, by being a thermal insulator, does not allow that the elements in which it is being applied develop dilations or contractions leading to the non-development of fissures in the coating.

The coating composition is also biodegradable which thus leads to causing no damage to the environment in the case of spills due to being emulsified in water and containing no asbestos and being eco-friendly to wildlife.

With its low density and molecular weight, the coating also leads to low manufacturing costs due to the use of cheap raw materials and simplified mixing technology.

EXAMPLE 1

The composition obtained from 23.17% water, 4.63% diatomite C110 (Celite C110®), 2.32% manganese oxide, 1.54% titanium bioxide, 3.09% calcined alumina, 1.25% hexylenglycol, 2.54% dibutyl phthalate, 1.25% texanol, 7.72% elastomeric acrylic resin, 3.86% acrylic thickener, 0.77% fungicide, 0.39% ammonium hydroxide, 0.42% anti-foaming agent, and 5.79% ceramic fiber, shows that the coating has great flexibility, due to its solid low content, excellent anti-corrosive properties, fire resistance medium range (650 degree Celsius), lesser structural weight, ideal for those elements requiring high weatherproof resistance and flexibility at the same time.

EXAMPLE 2

By redesigning the coating composition, greater weatherproof resistance and mechanical resistance is achieved if the composition comprises 50.19% water, 19.31% diatomite C110 (Celite C110®), 7.72% manganese oxide, 6.95% titanium bioxide, 9.65% calcined alumina, 8.25% hexylenglycol, 17.5% dibutyl phthalate, 8.25% texanol, 23.17% elastomeric acrylic resin, 1.93% acrylic thickener, 3.09% fungicide, 1.54% ammonium hydroxide, 2.32% anti-foaming agent, and 13.51% ceramic fiber. In this embodiment, the composition shows that the coating has greater mechanical resistance, as well as weatherproof resistance, a greater operation temperature a greater continuous fire contact exposition time.

EXAMPLE 3

With the following approximate proportions, greater levels of stability and uniform behavior are achieved: 38.61% water, 9.65% diatomite C110 (Celite C110®), 3.86% manganese oxide, 3.86% titanium bioxide, 3.86% calcined alumina, 3.86% hexylenglycol, 7.65% dibutyl phthalate, 3.86% texanol, 15.44% elastomeric acrylic resin, 2.70% acrylic thickener, 2.32% fungicide, 0.77% ammonium hydroxide, 1.54% anti-foaming agent, and 9.65% ceramic fiber. By using these percentages in the components, a designed quality is obtained for longer time fire resistance, a water repellent material which does not allow humidity absorption in the environment, preventing the generation of oxidation under the encapsulation principle, preventing temperature transfer, and is anti-termite. Due to the hardness of the same, there is no fume generation at the moment of contact with the flame, and there is no release of smells/odors when opening or using it, has a thermal resistance of more than 900 degree Celsius and low structural weight.

EXAMPLE 4

When the ceramic fiber ratio is varied, an increase and a decrease in the thermal transfer percentage is experienced while the coating remains stable. In that case and in the same way, thermal shock resistance increases or decreases the operation range. Said qualities are used in the manufacturing or production processes for the operation part which, due to its low weight and wide operating range, is placed in operations centers para decreasing the thermal transfer and optimizing the efficiency within the operation centers eliminating the traditional insulation volume.

EXAMPLE 5

With the following approximate proportions, a waterproofing product in a substantially solid form is obtained: 37.62% water, 7.83% diatomite C110 (Celite C110®), 3.76% titanium bioxide, 3.76% calcined alumina, 3.86% hexylenglycol, 7.65% dibutyl phthalate, 3.86% texanol, 15.44% elastomeric acrylic resin, 2.70% acrylic thickener, 2.32% fungicide, 0.77% ammonium hydroxide, 1.54% anti-foaming agent, and 9.65% ceramic fiber.

Among the many applications of the composition used as a coating of the present invention, one can find it being applied to any type of surface such as metallic, concrete, wood, drywall and its derivatives, plastic, glass, etc . . . , used in a number of industries including mining, aviation, oil and gas, construction, marine, medical, among others.

What is claimed is:

1. A composition used as a fire-resistant, insulating, ecological and corrosion-inhibiting coating, comprising:
   23-50% water,
   4-20% diatomite C110 (Celite C110®),
   2-8% manganese oxide,
   3-10% calcined alumina,
   7-24% elastomeric acrylic resin,
   1-4% acrylic thickener,
   3-2% ammonium hydroxide, and
   5-14% ceramic fiber.

2. The composition in accordance with claim 1, further comprising 1-7% titanium dioxide.

3. The composition in accordance with claim 1, further comprising 1-9% hexylenglycol.

4. The composition in accordance with claim 1, further comprising 2-18% dibutyl phthalate.

5. The composition in accordance with claim 1, further comprising 1-9% texanol.

6. The composition in accordance with claim 1, further comprising 0.7-4% fungicide.

7. The composition in accordance with claim 1, further comprising 0.4-3% anti-foaming agent.

* * * * *

UNITED STATES PATENT AND TRADEMARK OFFICE
CERTIFICATE OF CORRECTION

PATENT NO. : 9,951,230 B2
APPLICATION NO. : 15/537383
DATED : April 24, 2018
INVENTOR(S) : Moises Figueroa Martinez It is certified that error appears in the above-identified patent and that said Letters Patent is hereby corrected as shown below:

In the Claims

Column 4, Line 56, Claim 1 delete "3-2%", and replace with -- 0.3-2% --.

Signed and Sealed this
Fourteenth Day of August, 2018

Andrei Iancu
*Director of the United States Patent and Trademark Office*